United States Patent
Newell, Jr. et al.

(10) Patent No.: US 6,249,666 B1
(45) Date of Patent: Jun. 19, 2001

(54) PRINT PATH IDENTIFIERS TO IDENTIFY PRINT MEDIUM PATHS

(75) Inventors: Lawrence Bert Newell, Jr., Jalisco (MX); Ricardo Osuna Leyva, Boise, ID (US); Carlos F. Becerra Jimenez, Jalisco (MX); Gary G. Stringham, Boise, ID (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/444,217

(22) Filed: Nov. 19, 1999

(51) Int. Cl.[7] .................................................. G03G 15/00
(52) U.S. Cl. .............................................. 399/391; 399/77
(58) Field of Search .................................. 271/9.02, 9.03, 271/9.06; 347/110; 358/296, 501, 401; 399/75, 76, 77, 78, 391

(56) References Cited

U.S. PATENT DOCUMENTS

| | | | |
|---|---|---|---|
| 5,631,740 | * 5/1997 | Webster et al. ...................... | 358/296 |
| 5,651,623 | 7/1997 | Stodder et al. ...................... | 400/605 |
| 5,694,529 | * 12/1997 | Fromherz ............................. | 395/114 |
| 5,710,635 | * 1/1998 | Webster ............................... | 358/296 |
| 5,764,369 | * 6/1998 | Farrell et al. ........................ | 358/296 |
| 5,831,853 | * 11/1998 | Bobrow et al. ...................... | 364/191 |
| 5,895,139 | 4/1999 | Osaka et al. ......................... | 399/2 |
| 5,940,186 | 8/1999 | Barry et al. .......................... | 358/296 |

\* cited by examiner

Primary Examiner—Arthur T. Grimley
Assistant Examiner—Huang Ngo (57) ABSTRACT

A print medium is fed through a printer along a print path that can include one or more devices and a print engine. A plurality of path identifiers are used to identify the different print paths through the printer. According to one embodiment of the invention, a path identifier defines a print path from an input device through the print engine and possibly through an output device. According to another embodiment of the invention, path identifiers are separated into input paths and output paths. An input path identifier defines a print path from an input device to the print engine, while an output path identifier defines a print path from the print engine to an output device.

18 Claims, 5 Drawing Sheets

PRINT PATH IDENTIFIERS TO IDENTIFY PRINT MEDIUM PATHS

TECHNICAL FIELD

This invention relates to devices for producing images in media (e.g., printers, copiers, facsimile machines, etc.) and paper handling devices. More particularly, the invention relates to print path identifiers for identifying print medium paths in such devices.

BACKGROUND

Printer technology is continually advancing, resulting in commercially available printers with increasing speed, print quality, features, etc. A wide range of printers are commercially available, ranging from relatively inexpensive "desktop" models with few features to more expensive "printing press" models with many features and expandable options.

One problem facing many modem printers, especially the larger models, is controlling the transfer or flow of paper through the printer. The print medium is physically transferred through one or more devices in the printer. This physical path of the paper through the printer is typically referred to as the "print path" or "print medium path". Many printers either include or can be expanded to include additional features by adding input and/or output devices to the printer. For example, an additional input device may physically stamp each page being printed, or an additional output device may sort and/or fold pages after printing. As additional input and/or output devices are added to the printer, the number of print paths available in the printer increases. For example, a printer with an output device to fold pages would typically have at least two print paths, one in which the pages are fed through the output device (either folding or not folding the page), and another in which the pages are not fed through the output device.

A controller(s) within the printer communicates with the various devices in the printer to feed the pages through the proper print paths. One way to perform such communication is to "baby-sit" the print medium as it traverses a print path. The controller communicates with each of the individual devices in that print path one at a time, providing each with information regarding what, if anything, the device should do with the print medium (i.e., either pass the print medium through to another device or output the print medium directly). Such "one to one" communication, however, is burdensome on the controller and is made even more so with each new device that is added to the printer.

The invention described below addresses these and other problems, using print path identifiers to identify print paths in a printer.

SUMMARY

In a printer, a print medium is fed through the printer along a print path that can include one or more devices and a print engine. A plurality of path identifiers are used to identify the different print paths through the printer.

According to one aspect of the invention, a path identifier defines a print path from its input to its output from the printer, including the print engine as well as possibly one or more input or output devices. Upon receipt of a print request, a paper handling controller determines the path identifier corresponding to the print path that the print medium for that print request will take (which can be dependent on the print request itself). The paper handling controller then communicates the necessary information via the path identifier for that print path to all of the devices in the printer, thereby informing all of the devices in a single communication with a single path identifier of the print path being used for the print request.

According to another aspect of the invention, print path identifiers are separated into input paths and output paths. An input path identifier defines a print path from an input device to the print engine, while an output path identifier defines a print path from the print engine to an output device. Upon receipt of a print request, a paper handling controller determines the path identifier(s) corresponding to the print path that the print medium for that print request will take. The paper handling controller then communicates the input path identifier to the input devices in the printer and the output path identifier to the output devices in the printer.

According to another aspect of the invention, print path identifiers are established dynamically during printer initialization (e.g., after "power on" or a printer "reset"). During initialization, the paper handling controller identifies all of the different input and/or output devices that are part of the printer. Each of the possible paths through the printer are then identified and print path identifiers assigned to each of the possible paths. A message is then sent to each of the devices informing the device of each of the print path identifiers that start at the device, end at the device, or pass through the device.

BRIEF DESCRIPTION OF THE DRAWINGS

The present invention is illustrated by way of example and not limitation in the figures of the accompanying drawings. The same numbers are used throughout the figures to reference like components and/or features.

DETAILED DESCRIPTION

Figure 1:
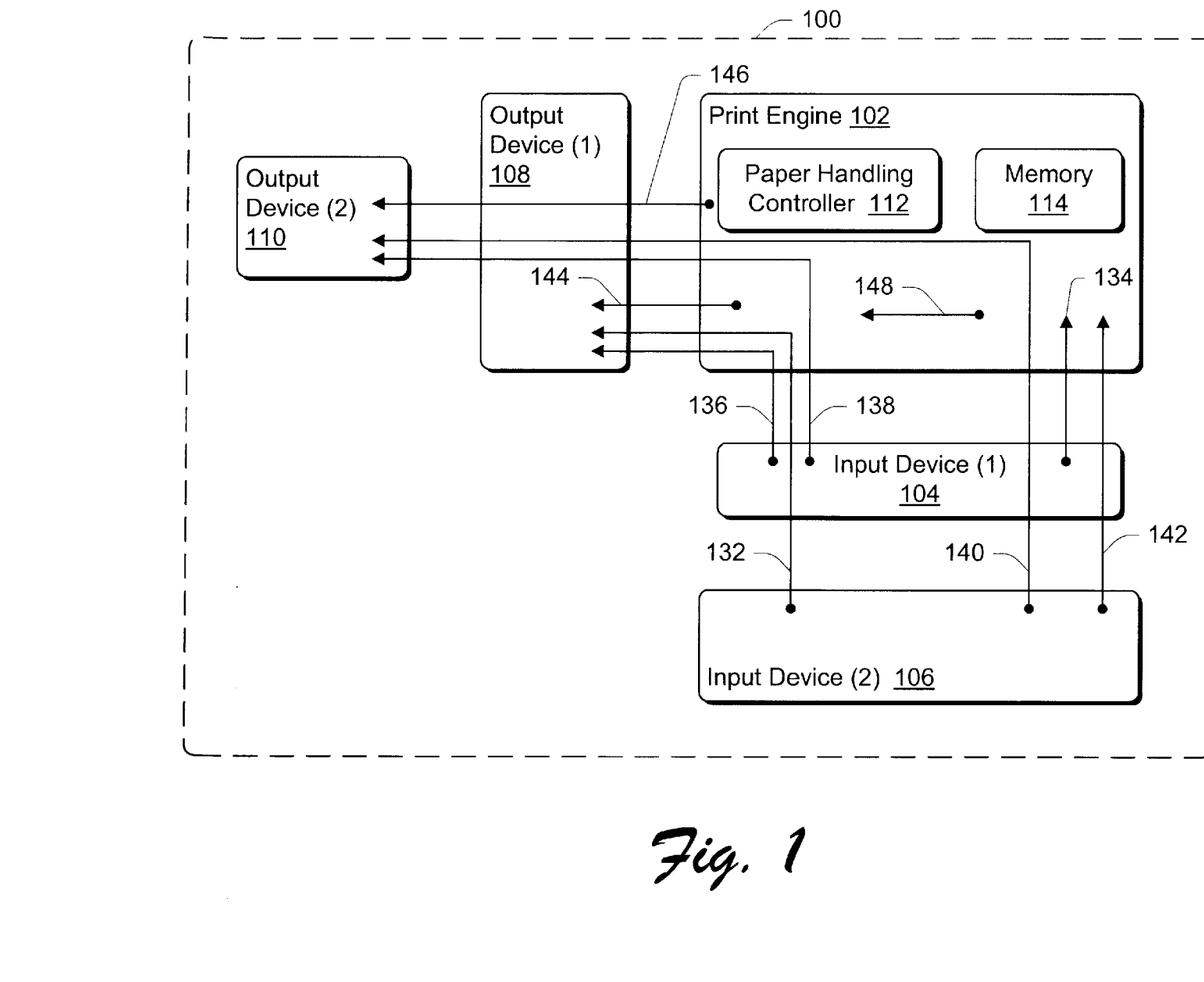
FIGS. 1 and 2 illustrate exemplary printers in accordance with embodiments of the invention.

FIG. 1 is a block diagram illustrating an exemplary printer in accordance with an embodiment of the invention. As used herein, a printer refers to any type of device that can produce an image (such as letters, pictures, drawings, etc.) in media (such as paper, plastic, fabric, etc.). Examples of such devices include impact printers, non-impact printers, digital copiers, analog copiers, facsimile machines, press machines, silk screen machines, etc. Printers can produce images in any of a wide variety of conventional print media (e.g., paper, plastic, fabric, etc.), however, for ease of discussion printers are discussed herein in the context of printing to paper.

Printer 100 includes a print engine 102, multiple input devices 104 and 106, and multiple output devices 108 and 110. During printing, a sheet of paper is provided to print engine 102 either via a direct paper feed of print engine 102 or one of the input devices 104 or 106. As the sheet of paper passes through print engine 102, the appropriate data is printed on the paper. The paper can be printed to in any of a wide variety of conventional manners, such as a conventional laser printing process or conventional inkjet printing process. The sheet of paper is then either output directly by print engine 102 via an output bin of print engine 102 or by one of the output devices 108 or 110.

Input devices 104 and 106 represent any of a wide variety of print medium source devices and pre-processing devices. Examples of input devices 102 and 104 include: a device with one or more paper trays for supplying one or more sizes or types of paper to print engine 102; a pre-processing device to put a "stamp" on each sheet of paper prior to printing (such as physically adding a stamp to the sheet of paper or adding a graphical image or text to the data for each page); a paper separating device to separate fan-folded media into separate sheets or to cut a sheet of paper from a roll of paper; a device to affix another piece of paper to the sheet for printing to (e.g., a Post-It® Note); a device to flip a sheet of paper or otherwise change its orientation; a hole-punching device to punch a hole(s) in each sheet of paper; a scanning device, such as to obtain a serial number from a sheet of paper or verify that pre-printed media is oriented correctly for printing; etc.

Output devices 108 and 110 include any of a wide variety of routing and finishing devices. Examples of output devices 108 and 110 include a paper sorter; a paper folder; a stapler; a hole punch; a gluing/binding device; a booklet maker to organize, fold, and bind the output as appropriate for a booklet; a device to stuff the paper into an envelope and optionally seal the envelope; a device to add job dividers (e.g., covers or colored paper); a shrink wrap device to wrap the printed sheets; a device to add tabbed section dividers; a perforating device to perforate the printed sheets; a device to cut an arbitrary shape in the printed sheets; a laminator to laminate all or part of a sheet (e.g., only the tabs); a mailbox device with different locations to receive printed sheets for different individuals; an embosser to emboss the printed sheets; a device to remove pieces of paper affixed to the sheet of paper for printing (e.g., Post-It® Notes); a device to affix ink from a just-printed to transfer medium onto cloth (e.g., iron onto a T-shirt); a shredder; etc.

Print engine 102, input devices 104 and 106, and output devices 108 and 110 can communicate with one another, transferring control information and data as necessary. Such communication may occur directly between two devices, or alternatively may be routed through print engine 102. Printer 100 includes additional components, such as a print head or other mechanism for producing the data to be printed on the print medium in print engine 102. However, such additional components are not particularly germane to the invention and thus will not be discussed further.

Print engine 102 includes a paper handling controller 112 and a memory/storage device 114. Paper handling controller 112 controls the transfer of a print medium through printer 100, including initialization of path identifiers and communication of path identifiers to the input and output devices as discussed in more detail below. Paper handling controller 112 can be implemented in any of a variety of conventional manners, such as using a programmed microcontroller, an application specific integrated circuit (ASIC), etc.

Memory 114 is a volatile and/or nonvolatile memory, such as random access memory (RAM), read only memory (ROM), a Flash EEPROM (electronically erasable programmable read only memory), a magnetic or optical storage device, etc. Memory 114 stores the print path identifiers used in the invention, and in one implementation also stores instructions to be executed by controller 112 to carry out the process(es) of the invention. Although memory 114 is illustrated as being separate from paper handling controller 112, alternatively all or part of memory 114 can be incorporated into controller 112.

Figure 2:
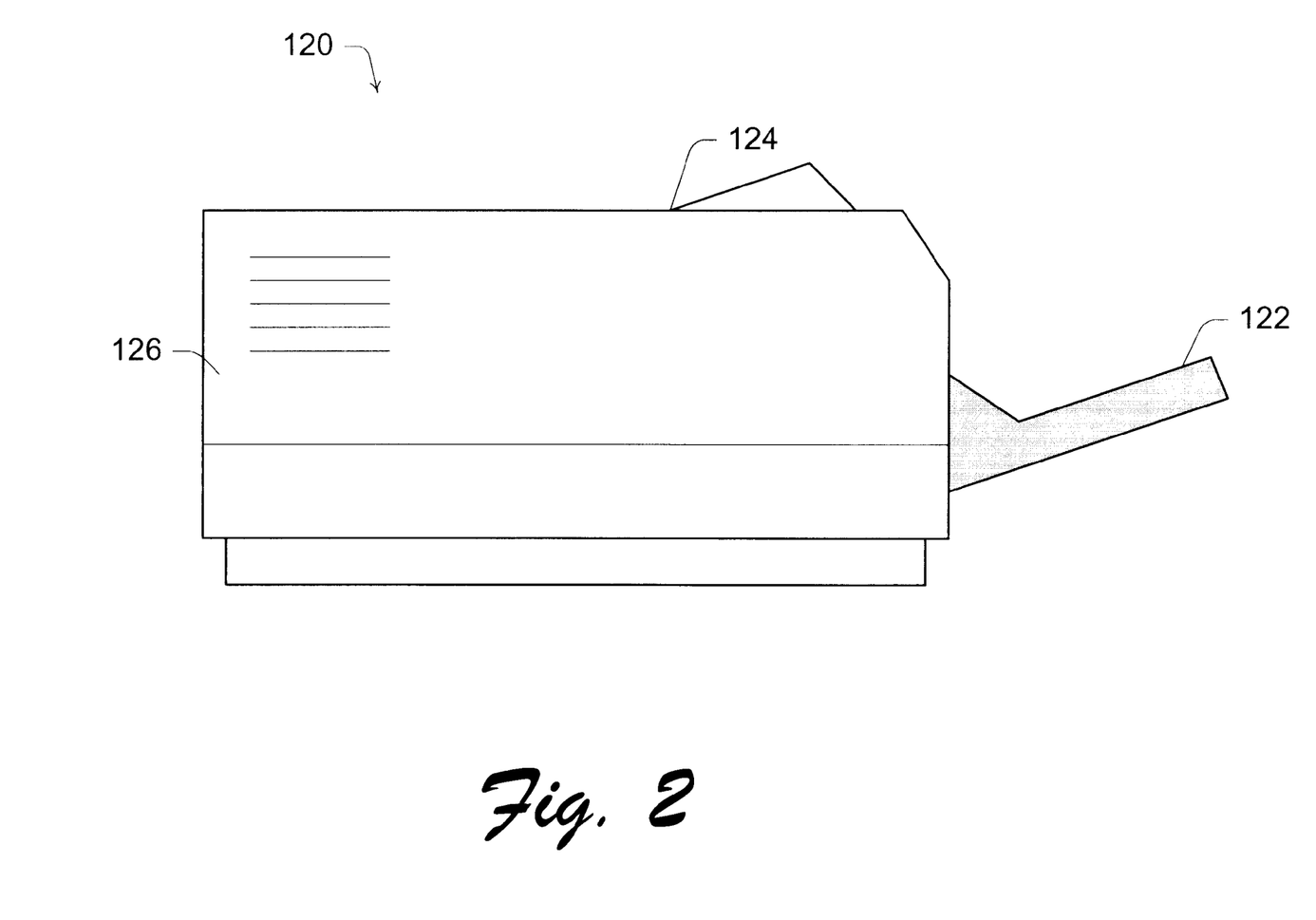

FIG. 2 illustrates an exemplary printer 120. Printer 120 can be the print engine 102 of FIG. 1. For example, an input paper tray 122 is a paper source and an output bin 124 on top of printer 120 collects the paper after it is printed to. Alternatively, printer 120 can be the combination of print engine 102, an output device 108 or 110, and an input device 104 or 106. For example, input tray 122 can be one of input devices 104 and 106, and output bin 124 can be one of output devices 108 and 110, and print engine 102 can be internal to the printer housing 126. Additional input devices (not shown) and output devices (not shown) may also be coupled to printer 120.

Returning to FIG. 1, numerous print paths exist through printer 100. Each print path begins at either an input device 104/106 or print engine 102, which is referred to as the starting location for the print path. Similarly, each print path ends at either an output device 108/110 or print engine 102, which is referred to as the ending location for the print path. Each print path can also pass through one or more input devices, output devices, or the print engine, which are referred to as pass through devices for that print path.

In the illustrated example of FIG. 1, multiple input devices are stacked "on top" of one another. In other words, sheets of paper from any other input device other than input device 104 are fed to print engine 102 via input device 104. Thus, if an additional input device (not shown) were added to printer 100 it would feed paper to print engine 102 via input devices 106 and 104. Alternatively, additional input devices may have paper paths that feed directly into print engine 102 without having to go through the other input devices. An analogous situation exists with regard to output devices being stacked "on top" of one another.

The print paths through printer 100 are illustrated by the arrows in FIG. 1. For example, a print path 132 originates at input device 106, passes through input device 104 and print engine 102, and ends at output device 108. By way of another example, a print path 134 originates at input device 104 and ends at print engine 102 without passing through any other devices. Each of the paths in printer 100 is assigned a unique path identifier or path ID, which can be numbers, letters, symbols, combinations thereof, etc. The identified print paths in printer 100 and exemplary path numbers are summarized in Table I below.

TABLE I

| Arrow Reference Number | Path ID | Path Starting Location | Path Ending Location | Pass Through Devices |
|---|---|---|---|---|
| 134 | 1 | input device 104 | print engine 102 | n/a |
| 136 | 2 | input device 104 | output device 108 | print engine 102 |
| 138 | 3 | input device 104 | output device 110 | print engine 102, output device 108 |
| 132 | 4 | input device 106 | output device 108 | input device 104, print engine 102 |
| 140 | 5 | input device 106 | output device 110 | input device 104, print engine 102, output device 108 |
| 142 | 6 | input device 106 | print engine 102 | input device 104 |
| 144 | 7 | print engine 102 | output device 108 | n/a |
| 146 | 8 | print engine 102 | output device 110 | output device 108 |
| 148 | 9 | print engine 102 | print engine 102 | n/a |

During initialization of printer 100, the information in Table I describing each of the paths is transmitted to each of the input and output devices of printer 100. During subsequent operation, when a sheet of paper is to be passed through a particular print path of printer 100, paper handling controller 112 communicates the path ID for that path to each of the devices in printer 100. Thus, a single message including a path ID can be sent to all of the devices in printer 100. Based on this path ID, each of the devices then knows whether it is to be the starting location for the sheet of paper, the ending location for the sheet of paper, whether the sheet of paper will pass through the device, or whether the device is not involved in the handling or printing of the sheet of paper.

The proper path for a sheet of paper that is to be printed to in response to a print request can be provided to printer 100 in any of a variety of different manners. For example, printer 100 may be coupled (e.g., either directly or via a network) to a computer (not shown) and receive print requests from the computer. Based on the various parameters of each print request (e.g., the paper source or paper type for the request, whether the output is to be bound, folded, hole-punched, etc.), print engine 100 determines the appropriate starting location (input device 104/106 or print engine 102) and the appropriate ending location (output device 108/110 or print engine 102), as well as which additional devices (if any) the sheet of paper needs to pass through. By way of another example, parameters for a print request may be input to printer 100 directly by the user, such as via an input console (not shown) on print engine 102. By way of yet another example, printer 100 may have default parameters that are used for each print request. The determination of which devices a sheet of paper should be fed through is known to those skilled in the art, and thus will not be discussed further.

Figure 3:
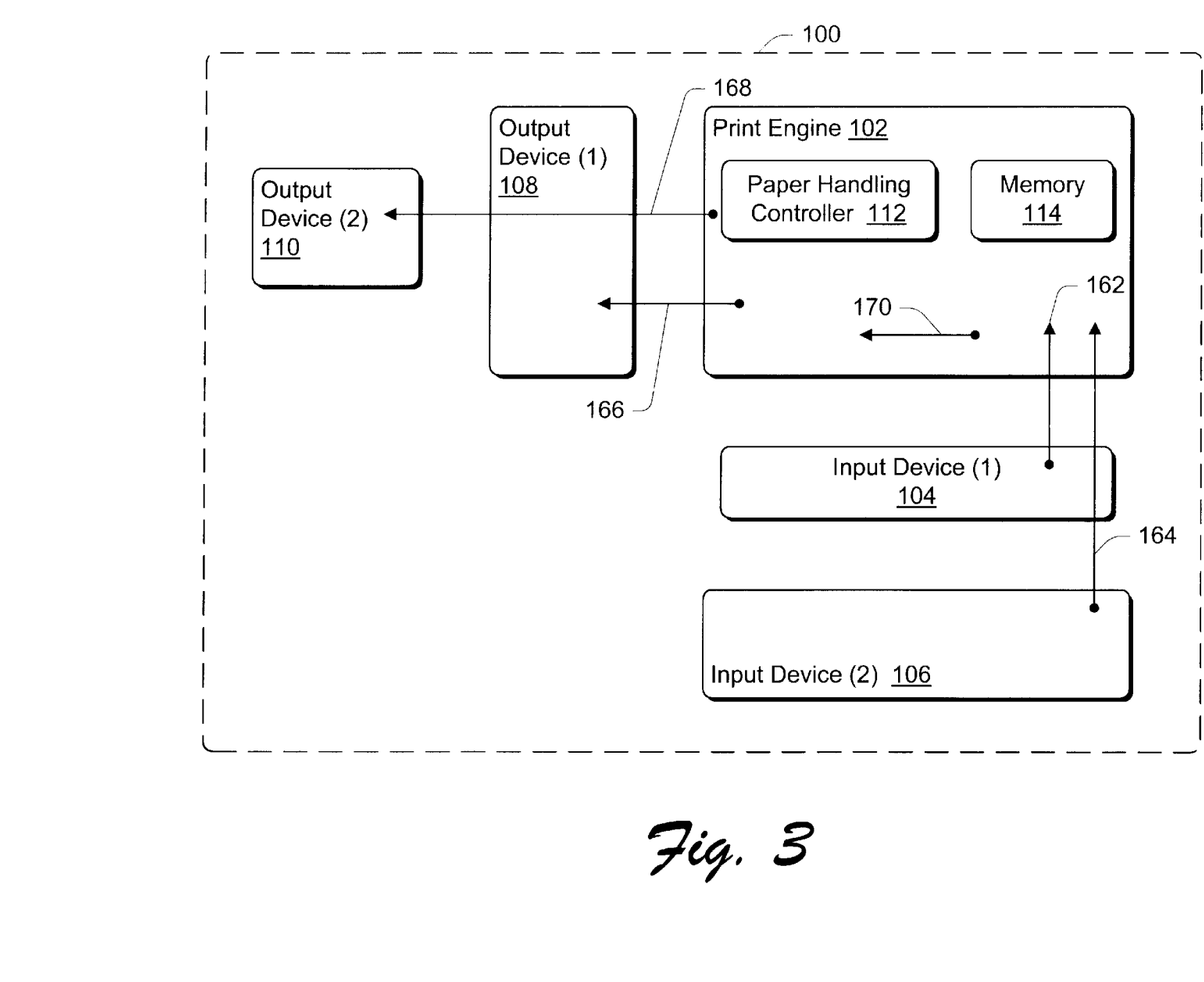
FIG. 3 illustrates exemplary input path identifiers and exemplary output path identifiers for a printer.

FIG. 3 illustrates printer 100 with different print path identifiers. In the example of FIG. 3, two different types of path identifiers are used: input path identifiers and output path identifiers. Input path identifiers are used to identify a path from an input device to the print engine (referred to as the input portion of the print path), while output path identifiers are used to identify a path from the print engine to an output device (referred to as the output portion of the print path). A path beginning and ending at print engine 102 can be either an input path or an output path. Each input path identifier and each output path identifier can identify either an entire print path (in the case where the print engine is either the ending or starting location) or a portion of a print path (in the case where the sheet of paper passes through the print engine).

The print paths or portions of print paths through printer 100 identified by the input and output path identifiers are illustrated by the arrows in FIG. 3. These print paths or portions of print paths and exemplary path numbers are summarized in Table II below.

TABLE II

| Arrow Reference Number | Path ID | Path Starting Location | Path Ending Location | Path Passes Through |
|---|---|---|---|---|
| 162 | 1 | input device 104 | print engine 102 | n/a |
| 164 | 2 | input device 106 | print engine 102 | input device 104 |
| 166 | 3 | print engine 102 | output device 108 | n/a |
| 168 | 4 | print engine 102 | output device 110 | output device 108 |
| 170 | 5 | print engine 102 | print engine 102 | n/a |

As illustrated in Table II and FIG. 3, by maintaining separate input path identifiers and output path identifiers the total number of path identifiers that need to be maintained in printer 100 is reduced. Each of the input devices only needs to maintain a path identifier to the print engine (and any pass through paths), and each of the output devices only needs to maintain a path identifier from the print engine (and any pass through paths). It is to be appreciated that as the number of devices in the printer 100 increases, this savings also increases.

When using separate input path identifiers and output path identifiers, paper handling controller 112 communicates both the input path identifier and the output path identifier for a sheet of paper (assuming the print engine 102 is neither the starting location nor the ending location for the sheet of paper) to the input and output devices rather than a single path identifier. If print engine 102 is the starting location then only the output path identifier need be communicated to the devices, and if print engine 102 is the ending location then only the input path identifier need be communicated to the devices, and if print engine 102 is both the starting and ending locations, then the path identifier(s) need not be communicated to any of the input or output devices.

Paper handling controller 112 of FIG. 1 (or FIG. 3) determines the physical topology of the printer 100 during the initialization of printer 100 and assigns path identifiers based on that physical topology. The printer 100 goes through its initialization process each time the printer 100 is powered-on. Alternatively, printer 100 may go through its initialization process during a "reset" sequence that can be initiated via hardware (e.g., user-actuation of a "reset" button) or alternatively via software (e.g., a "reset" command sent to printer 100 from a remote device coupled either directly to printer 100 or via a network).

The physical topology of printer 100 refers to the physical locations of the input devices relative to one another and the physical locations of the output devices relative to one another. This physical topology provides controller 112 with the necessary information to determine which input devices feed paper to print engine 102 via which other input devices, and which output devices receive paper from print engine 102 via which other output devices. Each input device knows what other input devices (or the print engine) it is directly coupled to and similarly each output device knows what other output devices (or the print engine) it is directly coupled to. This knowledge may be manually input to each device (e.g., during installation of the device into the printer) or may be automatically determined by each device (e.g., by sensing another device electrically coupled to a communication port).

The number of input devices and their physical locations relative to one another are determined by controller 112 controlling the powering on of the devices one by one. Initially, controller 112 powers on the input device(s) coupled directly to print engine 102 one by one, which is input device 104 in the illustrated example. As part of the device's power-on initialization process, input device 104 requests an address from controller 112. Controller 112 determines an address for device 104 and informs device 104 of that address, which in turn acknowledges receipt of the address. The determination can be performed in any of a variety of conventional manners, such as a particular ordering (e.g., addresses assigned sequentially in the order they are requested), a pre-defined device to address mapping, etc.

Input device 104 can include one or more communications ports with devices connected thereto, which is input device 106 in the illustrated example. For each communication port of input device 104, controller 112 requests device 104 to power on the device coupled to that communication port. When that device (if any) powers on, it also requests an address from controller 112. The above process then continues, with each input device being powered on and assigned an address from controller 112. Controller 112 then repeats the process for the output devices.

Alternatively, different processes may be used to identify the physical locations of the input devices relative to one another and the output devices relative to one another. For example, the output devices may be identified first and then the input devices, or the output devices and input devices may be identified substantially concurrently. By way of another example, controller 112 may receive an indication of the physical topology of printer 100 via a direct user input (e.g., via a control console of print engine 102) or from some other device coupled to printer 100 either directly or via a network (not shown).

Regardless of the exact process used to identify the physical topology of printer 100, once the topology is identified controller 112 can readily determine all of the possible print paths in printer 100, including the starting locations, ending locations, and each device (or the print engine) the path passes through. A different print path identifier is assigned to each of these possible print paths and the information describing each print path, along with its print path identifier, is stored in memory 114.

As illustrated in Table I above, nine different print paths exist in printer 100 of FIG. 1. Information regarding these print paths is sent out to the devices 104, 106, 108, and 110 during the initialization process.

Figure 4:
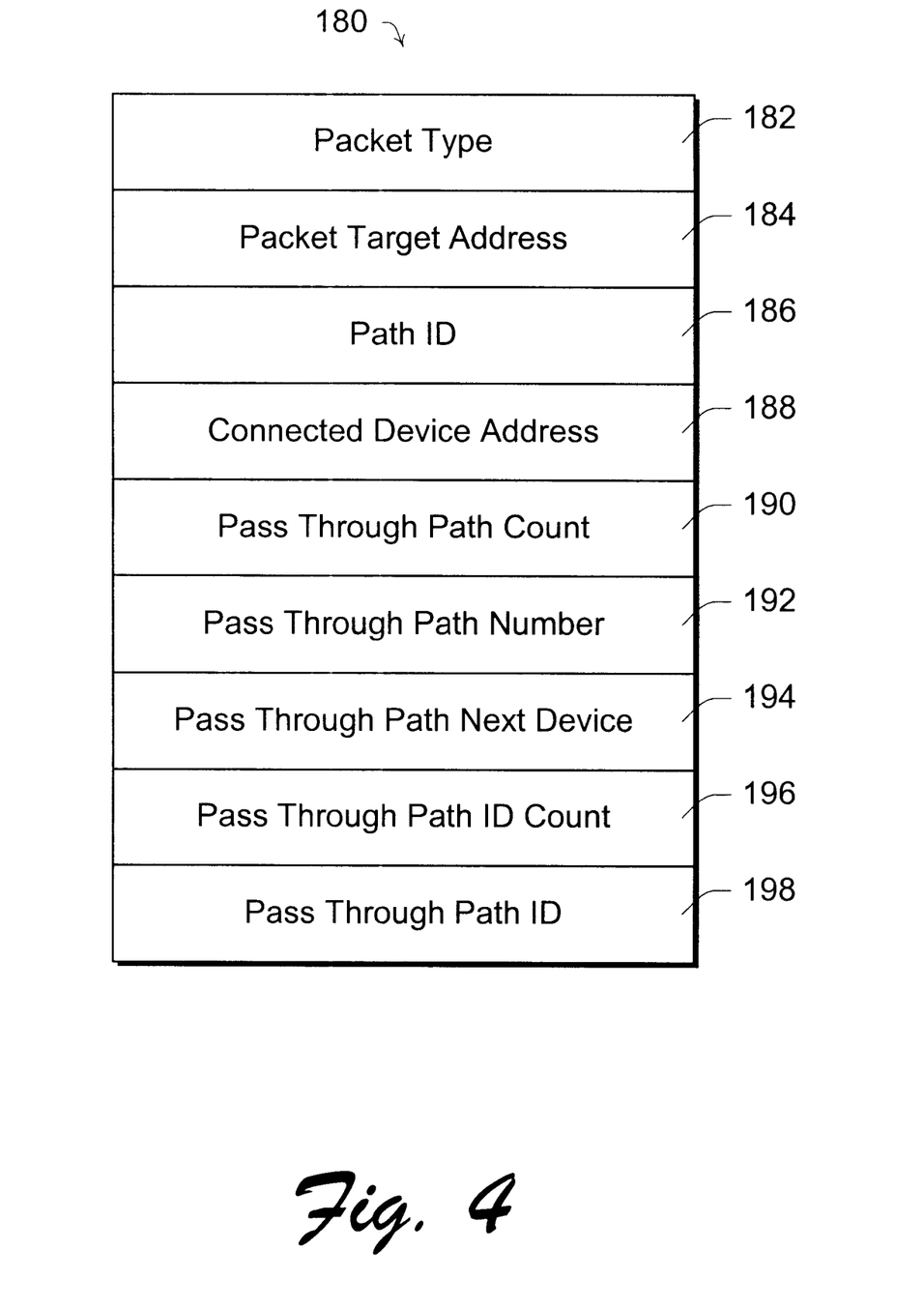
FIG. 4 is a block diagram illustrating an exemplary message packet communicating path information to an input device or output device during the initialization process.

FIG. 4 is a block diagram illustrating an exemplary message packet communicating path information to a device 104–110 of FIG. 1 during the initialization process. As illustrated, each packet 180 includes a packet type field 182, a packet target address field 184, a path ID field 186, a connected device address field 188, a pass through count field 190, a pass through path number field 192, a pass through path next device field 194, a pass through path ID count field 196, and a pass through path ID field 198. A different packet 180 is sent to each device 104–110 during the initialization process.

Packet type field 182 indicates whether the device targeted by packet 180 is an input device or an output device. Packet target address field 184 includes the address of the device targeted by packet 180. Path ID field 186 includes the path identifier(s) for each path that uses the device identified in packet target address field 184 as the starting location (if the device is an input device) or an ending location (if the device is an output device).

Connected device address field 188 identifies a device (or print engine) that is connected to the device identified in packet target address field 184. If the device identified in address field 184 is an input device, then connected device address field 188 identifies the connected "downstream" (towards the print engine) device. For example, in FIG. 1, the packet 180 sent to input device 106 would identify input device 104 in connected device address field 188, and the packet 180 sent to input device 104 would identify print engine 102 in connected device address field 188. Similarly, if the device identified in address field 184 is an output device, then address field 188 identifies the connected "upstream" (towards the print engine) device. For example, in FIG. 1, the packet 180 sent to output device 110 would identify output device 108 in connected device address field 188, and the packet 180 sent to output device 108 would identify print engine 102 in connected device address field 188.

Pass through path count field 190 identifies the number of pass through paper paths for the device identified in address field 184. A pass through paper path refers to a paper path that passes through the device on its way to a different device—a different pass through paper path is counted for each different device coupled to the device identified in address field 184. For example, in FIG. 3, the pass through path count field 190 for the packet 180 sent to output device 108 has a value of one, while the pass through path count field 190 for the packet 180 sent to output device 110 has a value of zero. By way of further example, if an additional output device (not shown) were coupled to output device 108 so that paper could be fed from output device 108 to either this additional output device or output device 110, then the pass through path count field 190 for the packet 180 sent to output device 108 would have a value of two.

Pass through path number field 192 is an identifier(s) of the pass through paper path(s) for the device identified in address field 184. Pass through path next device 194 is an identifier(s) of the next device in the pass through paper path. By way of example, for the packet 180 sent to output device 108, the pass through path next device 194 identifies output device 110.

Pass through path ID count field 196 identifies the number of different path identifiers that use the path through path(s) identified in fields 190–194. By way of example, in FIG. 1, the packet 180 sent to output device 108 includes in pass through path ID count field 196 the value three, as three different path identifiers (represented by arrows 138, 140, and 146) use the pass through paper path to output device 110.

Pass through path ID field 198 includes each of the different path identifiers that use the path through paper path(s) identified in fields 190–194. By way of example, if the print paths in FIG. 1 include the path identifiers of Table I above, then pass through path ID field 198 includes the path identifiers 3, 5, and 8.

Alternatively, some of the fields illustrated as single fields in FIG. 4 may be multiple fields in packet 180. For example, a separate pass through path ID field 198 may be included for each of the different path identifiers. Additionally, although illustrated as a single message packet, alternatively the initialization message from packet 180 may be sent to the input and output devices as multiple messages or as multiple packets within the same message.

Situations can arise where all of the fields in packet 180 are not necessary. For example, in FIG. 1 output device 110 has no pass through paper paths, so fields 192, 194, 196, and 198 are not necessary. In such situations, these fields can be deleted from packet 180, or alternatively can be left empty (e.g., by assigning some "null" or other value that signifies emptiness).

Figure 5:
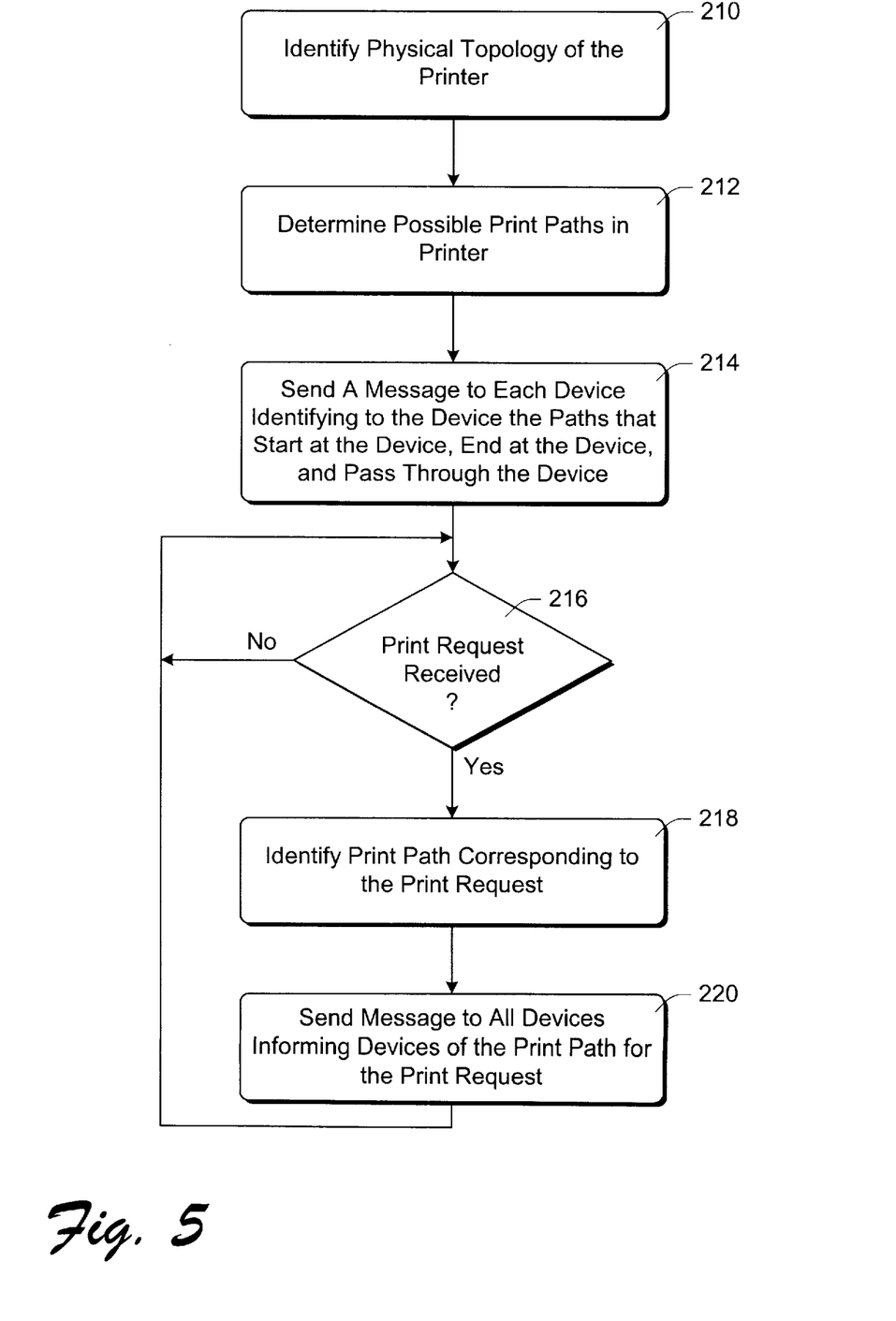
FIG. 5 is a flowchart illustrating an exemplary process for initializing a printer with path identifiers and using the path identifiers.

FIG. 5 is a flowchart illustrating an exemplary process for initializing a printer with path identifiers and using the path identifiers. The steps are implemented by controller 112 of FIG. 1 or FIG. 3, and may be performed in software. FIG. 5 is described with additional reference to components in FIGS. 1 and 3.

Paper handling controller 112 initially identifies the physical topology of the printer 100, step 210. As discussed above, this includes identifying the physical locations of the input devices with respect to one another and the physical locations of the output devices with respect to one another. Using the physical topology, controller 112 determines the possible print paths in the printer 100, step 212.

Controller 112 then sends initialization messages (e.g., packets 180 of FIG. 4) to each input and output device in the printer 100, step 214. These message packets identify to each device the print paths that start at the device, end at the device, and pass through the device. Each device stores the information from the message packet it receives, thereby allowing it to behave properly upon receipt of a subsequent print identifier, as discussed in more detail below.

Once the print path identifiers are established and the devices configured with the print path identifiers, controller 112 waits for a print request to be received, step 216. Upon receipt of a print request, controller 112 identifies the print path corresponding to the print request (that is, the print path to be used for the print request), step 218. Controller 112 then sends the print path identifier (or the input and output print path identifiers) for the print request to all the devices in the printer, step 220. The print path identifier (or the input and output print path identifiers), in conjunction with the initialization message packets discussed above, informs each of the devices whether pages for the print request will originate from the device, whether pages for the print request will be delivered to the device, whether pages for the print request will pass through the device, or whether the device has nothing to do with the print request.

During the process of printing a page(s) of paper for a print request, additional parameters and data for the print request are forwarded to the input and output devices in the printer. For example, which of multiple input trays to use as the source of the pages, whether to staple the printed pages, whether to sort the printed pages, etc. The communication of such information is well known to those skilled in the art, and thus will not be discussed further.

In the illustrated example, the path identifier is sent by controller 112 in step 220 for each page or sheet of paper that is fed through printer 100 for the print request, regardless of how many pages or sheets are included in the print request. Alternatively, the path identifier may be sent out for an entire print request and thus not duplicated for each sheet in the print request.

Alternatively, rather than initializing all of the devices and print path identifiers at once, such initialization could be performed over time as requests are received. For example, in response to a received print request that includes an input device or output device that has not previously been used, the controller 112 can send out an initialization message to that device(s).

Thus, print path identifiers to identify print medium paths in a printer are described herein. Print path identifiers can advantageously be used to quickly and easily identify to all of the devices in the printer their involvement in printing of a particular page, including whether they are the source of the page, the destination of the page, whether the page passes through them, or whether they are not involved in the printing of the page. Additionally, the print path identifiers are dynamically assigned, allowing additional devices (and thus additional print paths) to easily be added to the printer.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A printer comprising:

one or more input devices;

one or more output devices;

a print engine coupled to receive a print medium from the one or more input devices; and a controller coupled to send a message to the one or more input devices, the message including a path identifier that identifies one of a plurality of print paths through the printer for the print medium, wherein the path identifier indicates a print path starting location that is one of the one or more input devices, a print path ending location that is one of the one or more output devices, and any of the input or output devices that the identified print path passes through.

2. A printer as recited in claim 1, further comprising a storage device, coupled to the controller, to store a plurality of path identifiers each identifying one of a plurality of print paths through the printer for the print medium.

3. A printer as recited in claim 1, further comprising one or more output devices that can be part of one or more of the plurality of print paths.

4. A printer as recited in claim 1, wherein:

the starting location comprises either one of the input devices or the print engine; and the ending location comprises either one of the output devices or the print engine.

5. A method comprising:

receiving, at a printer, a print request; and transmitting, to a plurality of devices in the printer that are part of a print path for the print request, a path identifier that identifies a starting location and an ending location for the print path.

6. A method as recited in claim 5, wherein:

the print request comprises a request to print a plurality of pages; and the transmitting comprises transmitting, to the plurality of devices, the path identifier for each of the plurality of pages.

7. A method as recited in claim 5, wherein:

the starting location comprises either one of the input devices or the print engine; and the ending location comprises either one of a plurality of output devices or the print engine.

8. A computer-readable memory containing a computer program that is executable by a computer to perform the method recited in claim 5.

9. A method comprising:

receiving, at a printer, a print request;

transmitting, to one or more input devices in the printer, an input path identifier that identifies an input starting location and an input ending location for an input portion of the print path corresponding to the print request; and transmitting, to one or more output devices in the printer, an output path identifier that identifies an output starting location and an output ending location for an output portion of the print path corresponding to the print request.

10. A method as recited in claim 9, wherein:

the transmitting an input path identifier comprises transmitting an input path identifier that identifies an input device as the input starting location and a print engine as the input ending location; and the transmitting an output path identifier comprises transmitting an output path identifier that identifies the print engine as the output starting location and an output device as the output ending location.

11. A computer-readable memory containing a computer program that is executable by a computer to perform the method recited in claim 9.

12. A method for initializing print path identifiers in a printer system, the method comprising:

identifying a physical device topology of a plurality of devices in the printer system; and sending a plurality of messages to the plurality of devices, each of the plurality of messages including a print path identifier that identifies a print path in the printer system, and one or more of a starting device for the print path and an ending device for the print path.

13. A method as recited in claim 12, wherein the print path identifier identifies a first device at which the print path starts and a second device at which the print path ends.

14. A method as recited in claim 13, wherein the first device comprises an input device of the printer and the second device comprises an output device of the printer.

15. A method as recited in claim 12, wherein one of the plurality of messages further includes an indication of a number of print paths that pass through a device without starting or ending at the device.

16. A method as recited in claim 12, wherein one of the plurality of messages further includes an identifier of a print path that passes through a device without starting or ending at the device.

17. A method as recited in claim 12, wherein the sending comprises sending, to a device, a message that includes a path identifier for each print path that either starts at or ends at the device.

18. A computer-readable memory containing a computer program that is executable by a computer to perform the method recited in claim 12.

* * * * *